United States Patent [19]

Veyrat

[11] Patent Number: 4,663,963
[45] Date of Patent: May 12, 1987

[54] MACHINE FOR LEAK TESTING PARTS BY THE "PENETRATION" METHOD

[75] Inventor: Gilles Veyrat, Minzier, France
[73] Assignee: Alcatel, Paris, France
[21] Appl. No.: 879,748
[22] Filed: Jun. 27, 1986
[30] Foreign Application Priority Data Jul. 4, 1985 [FR] France .................. 85 10241

[51] Int. Cl.⁴ .............................................. G01M 3/20
[52] U.S. Cl. ....................................................... 73/45
[58] Field of Search ............................ 73/41, 45, 40.7; 209/591, 655, 571

[56] References Cited

U.S. PATENT DOCUMENTS

| 3,126,734 | 3/1964 | Stutzman | 73/40 |
| 3,486,365 | 12/1969 | Briggs | 73/40.7 |
| 4,184,362 | 1/1980 | Standley et al. | 73/40.7 |
| 4,608,866 | 9/1986 | Bergquist | 73/40.7 |

OTHER PUBLICATIONS

Western Electric, Technical Digest, No. 35, Jul. 1974, pp. 19–20, New York, US; R. M. Filek et al.: "Testing and Sorting Apparatus".
Patent Abstracts of Japan, vol. 6, No. 237 (p. 157) (1115), Nov. 25, 1982; & JP-A-57 137 835 (Hitachi Seisakusho K.K.) Aug. 25, 1982.
Solid State Technology, vol. 26, No. 7, Jul. 1983, pp. 45–46, Port Washington, New York, US; "Automated leak tester".

Primary Examiner—Stewart J. Levy
Assistant Examiner—Joseph W. Roskos
Attorney, Agent, or Firm—Sughrue, Mion, Zinn, Macpeak & Seas

[57] ABSTRACT

A machine for leak testing parts by the "penetration" method, the machine comprises: a pivoting test chamber (1) having an open first end (2) and an opposite, closed second end (3), and being pivotable about a horizontal axis (4); a loading chute (7) for loading said test chamber with the parts; a docking member (8) capable of controllably putting the open end of the pivoting chamber into sealed communication with a leak detector; an unloading chute (9) having first and second paths (10, 11) selectable by a switch (12, 13); and means (5) for tilting the pivoting chamber to occupy three distinct positions: a first position in which the pivoting chamber (1) tilts upwardly above the horizontal at an angle α and is in alignment with the loading chute (7); a second position in which the pivoting chamber (1) is horizontal and in alignment with the docking member (8); and a third position in which the pivoting chamber (1) tilts downwardly below the horizontal at an angle β and is in alignment with the unloading chute (9); the angles α and β being sufficient to ensure that the part to be tested moves along the chamber solely under the effect of gravity.

2 Claims, 4 Drawing Figures

MACHINE FOR LEAK TESTING PARTS BY THE "PENETRATION" METHOD

The present invention relates to a machine for leak testing parts by the "penetration" method.

BACKGROUND OF THE INVENTION

There are several methods in use for leak testing parts. One known method consists in evacuating the part under test, putting the evacuated interior of the part into communication with a leak detector and then immersing the outside of the part in a tracer gas. If the part is cracked, the tracer gas penetrates into the part and is detected by the leak detector. However, the part to be tested may not include an orifice for providing access to its interior in order to pump out the vacuum. This is true of electronic integrated circuit packages, for example. The "penetration" method is then used. This method begins by immersing the part to be tested in an atmosphere of tracer gas (usually helium) under a pressure of several atmospheres. The part is then "aired", i.e. it is exposed to air at atmospheric pressure for a while. It is then placed in a sealable container which is connected to a vacuum pump and to a leak detector. If the part is cracked, the helium which penetrated into the crack(s) while the part was immersed in helium under pressure now escapes and is detected.

The invention is thus applicable to leak testing a part which does not have an orifice to provide access to the interior thereof, and more particularly it relates to a machine for performing the leak testing step per se, i.e. to a machine which receives parts that have already been immersed in tracer gas under pressure and then "aired".

SUMMARY OF THE INVENTION

The present invention provides a machine for leak testing parts by the "penetration" method, the machine comprising:

a pivoting test chamber having an open first end and an opposite, closed second end, and being pivotable about a horizontal axis;

a loading chute for loading said test chamber with said parts;

a docking member capable of controllably putting the open end of said pivoting chamber into sealed communication with a leak detector;

an unloading chute having first and second paths selectable by switch means; and means for tilting said pivoting chamber to occupy three distinct positions:

a first position in which the pivoting chamber tilts upwardly above the horizontal at an angle $\alpha$ and is in alignment with said loading chute;

a second position in which the pivoting chamber is horizontal and in alignment with said docking member; and a third position in which the pivoting chamber tilts downwardly below the horizontal at an angle $\beta$ and is in alignment with the unloading chute;

said angles $\alpha$ and $\beta$ being sufficient to ensure that said part to be tested moves along said chamber solely under the effect of gravity.

In a preferred embodiment of the invention, said docking member comprises a hollow piston connected by a flexible link to said leak detector, said piston being slidably mounted inside a fixed cylinder, said piston and cylinder co-operating with control means to enable said piston to move in either of two opposite directions relative to said cylinder, said open end of said pivoting chamber and the end of said piston furthest from its connection to said leak detector including means for sealing the join between said piston and said open end of said pivoting chamber when said piston is in its docking position against said open end.

BRIEF DESCRIPTION OF THE DRAWINGS

An embodiment of the invention is described, by way of example, with reference to the accompanying drawings, in which.

MORE DETAILED DESCRIPTION

Figure 1:
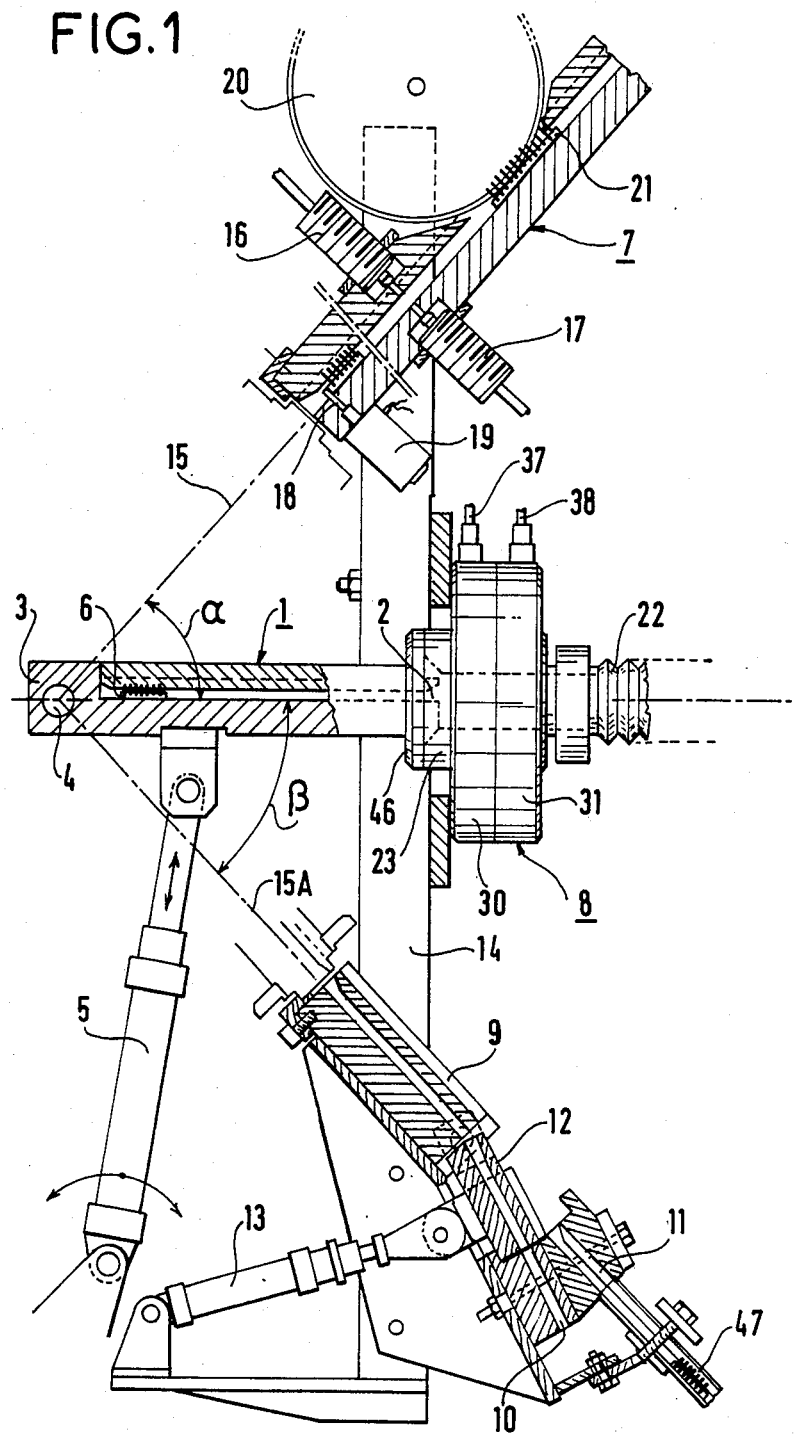
FIG. 1 shows a machine in accordance with the invention and in partial section.

With reference to the figures, a machine in accordance with the invention essentially comprises a pivoting chamber 1 having an open first end 2 and a closed second end 3.

The pivoting chamber 1 includes a rotary shaft 4 in the vicinity of its closed end 3 to enable the chamber to pivot. Rotation of the chamber is controlled by means of a jack 5.

Figures 2, 3:
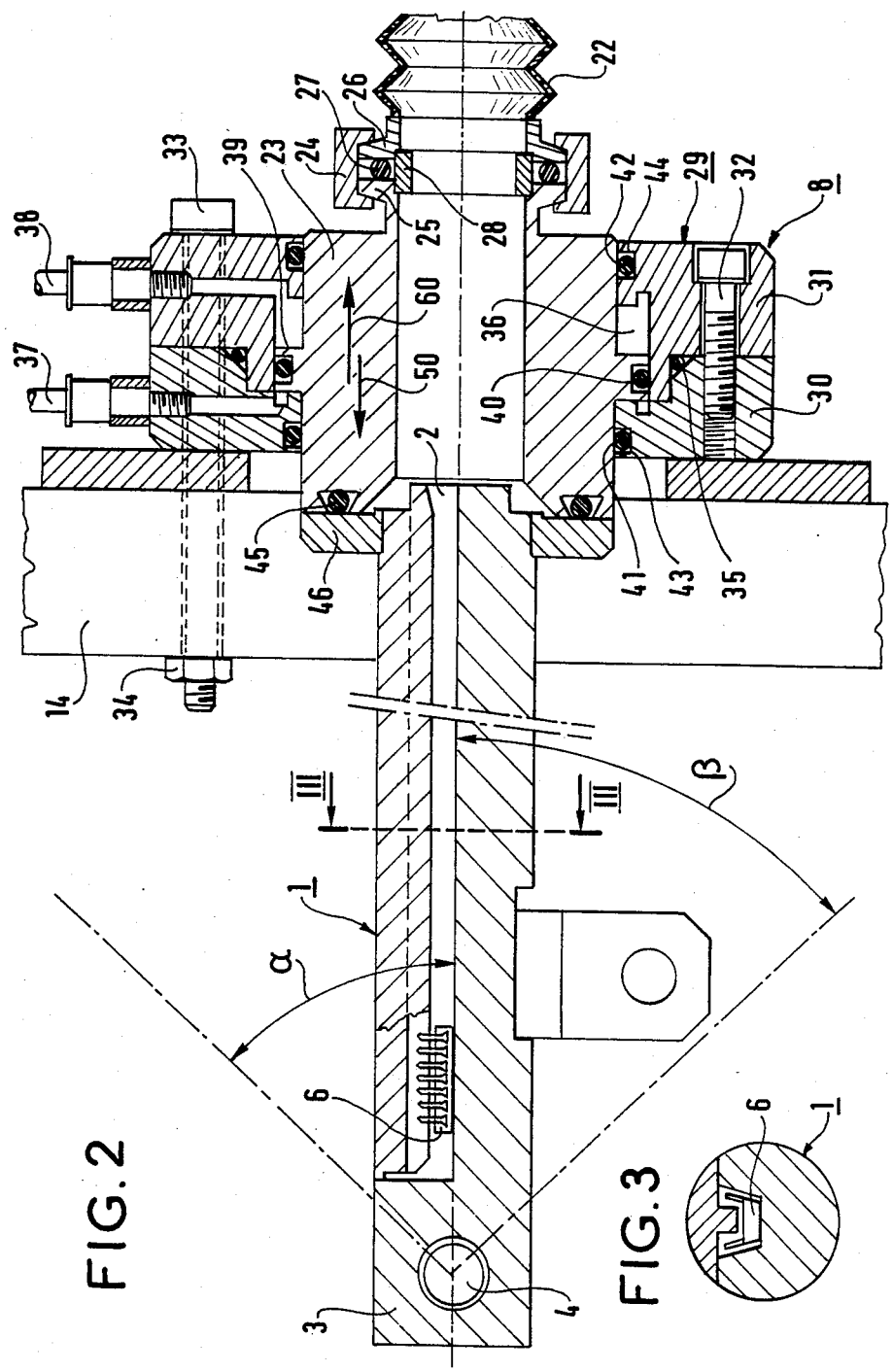
FIG. 2 is a section view on a larger scale of a pivoting chamber and a docking member.
FIG. 3 is a cross section through the pivoting chamber on a line III—III of FIG. 2.
Figure 4:
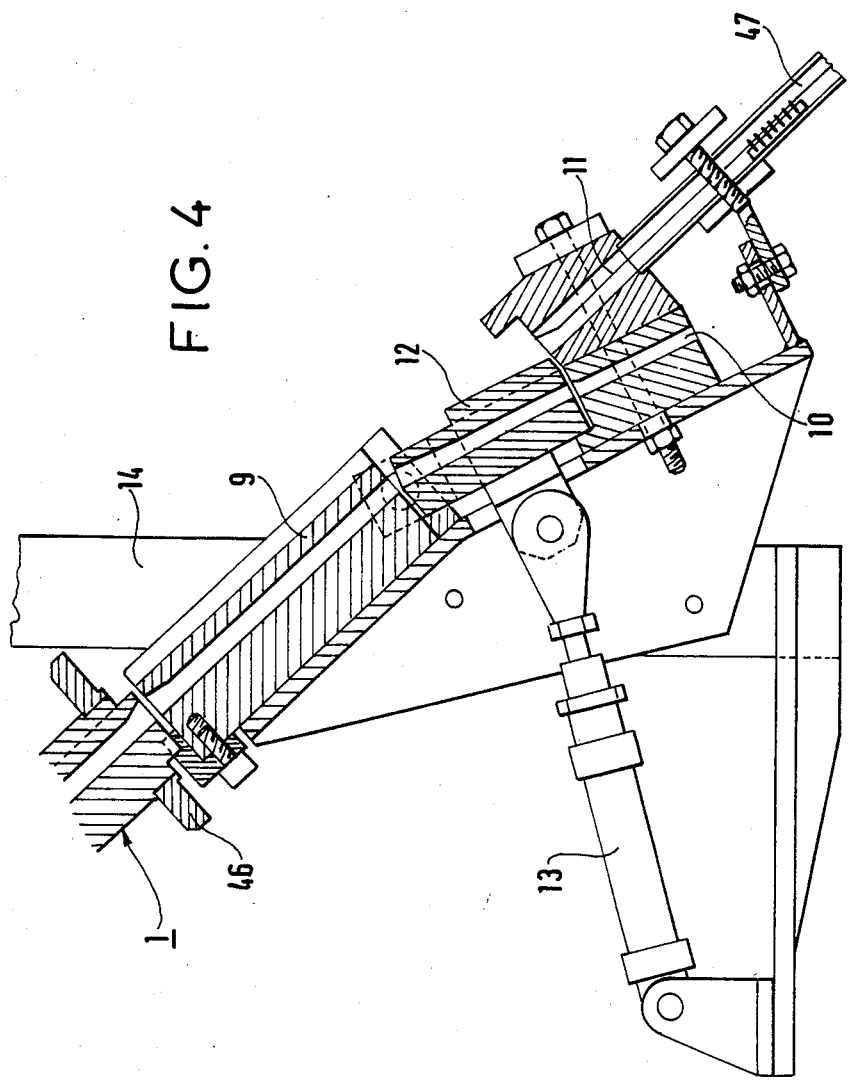
FIG. 4 is a view on a larger scale of a two-channel unloading chute.

FIG. 3 shows the chamber in cross section together with an integrated circuit 6 disposed therein for testing.

The machine also includes a loading chute 7, a docking member 8 and an unloading chute 9 having two outlet paths 10 and 11 supplied from a switch chute 12 whose position is controlled by a hinged jack 13. These items are fixed to a frame 14.

The pivoting chamber 1 can take up three different positions: a first position at an angle $\alpha$ above the horizontal and in alignment with the loading chute 7 (this position is represented in FIG. 1 by a dot-dashed line 15 terminated in a fine line representation of the end of the pivoting chamber); a second position which is horizontal as shown in FIGS. 1 and 2 and in which the chamber is aligned with the docking member 8; and a third position at an angle $\beta$ below the horizontal in which the pivoting chamber 1 is alignment with the loading chute 9. This position is likewise represented in FIG. 1 by means of a dot-dashed line 15A terminated in a fine line representation of the end of the pivoting chamber. The angles $\alpha$ and $\beta$ are advantageously, but not necessarily, equal. In addition, these angles are large enough to ensure that the items under test can slide into and out from the pivoting chamber solely under the effect of gravity.

The loading chute 7 is fitted with an opto-electronic counter 16–17 for counting the integrated circuits (i.e. the items to be tested) as they are fed into the pivoting chamber. A retractable abutment 18 under the control of an electromagnet 19 is used to stop the integrated circuits. A drive wheel 20 having a rubber shoe is used to hold or to advance circuits 21 at will, as they arrive in the loading chute 7.

FIG. 2 is a view on a larger scale of the docking member 8 which connects the open end 2 of the pivoting chamber 1 in sealed manner to a leak detector (not shown) including pump means and capable of performing leak testing on the integrated circuit(s) such as contained in the pivoting chamber. The docking member 8 is connected to the leak detector via a flexible link 22.

The docking member 8 includes a hollow piston 23 which is connected to said hollow link 22 in sealed manner by means of a clamping collar 24 which clamps together two end flanges 25 and 26 against a sealing ring 27 with sealing ring compression being limited by a ring 28. The hollow piston 23 is free to slide inside a fixed cylinder 29 which made up of two portions 30 and 31 that are interconnected by screws such as 32, and which is connected to the frame 14 by nuts and bolts such as 33 and 34. A sealing ring 35 seals the assembled parts 30 and 31. The bore of the cylinder 29 is open at both ends so that the piston 23 passes right through the cylinder. In addition, an annular chamber 36 is provided in the bore. Pneumatic ducts 37 and 38 lead to opposite sides of the annular chamber 36 and serve to drive the hollow piston 23 in one or other of the directions indicated by arrows 50 and 60, by applying pressure to one side or the other of an annular collar 39 around the hollow piston and dividing the chamber 36 into two parts which are sealed from each other by by a sealing 40 on the collar 39 and which are sealed from the outside by sealing rings 41 and 42 located in respective grooves 43 and 44 in the cylinder 29. The end of the hollow piston 23 which faces the pivoting chamber 1 (i.e. the left hand end in the figures) is fitted with a sealing ring 45 which bears against a thrust flange 46 fixed to the open end 2 of the pivoting chamber 1, when said pivoting chamber is in its test position as shown in FIGS. 1 and 2.

Operation is as follows:

The pivoting chamber 1 begins in its upper position as shown by dot-dashed line 15 in FIG. 1.

The piston 23 of the docking member 8 is in its retracted position i.e. it is moved to the end of its stroke in the direction indicated by arrow 60 by pneumatic pressure from the duct 37.

A desired number of integrated circuits are then allowed to pass into the pivoting chamber 1 by retracting the stop 18. The circuits passing into the chamber are counted by the counting system 16–17. The pivoting chamber is then moved to its horizontal position in alignment with the docking member 8 and pressure is then applied to duct 38 so as to move the hollow piston 23 in the direction of arrow 50 so as to make sealed contact with the end of the pivoting chamber.

Leak testing is then performed in the conventional manner, and once testing has been completed, the pivoting chamber 1 is pivoted downwards and the circuits it contains are directed either to the path 11 or else to the path 10, depending on whether the test result is good or bad. A tube 47 is connected to the bottom end of the path 11 in order to collect circuits which have been tested as good.

I claim:

1. A machine for leak testing parts by the "penetration" method, the machine comprising:
   a pivoting test chamber having an open first end and an opposite, closed second end, and being pivotable about a horizontal axis;
   a loading chute for loading said test chamber with said parts;
   a docking member capable of controllably putting the open end of said pivoting chamber into sealed communication with a leak detector;
   an unloading chute having first and second paths selected by switching means; and
   means for tilting said pivoting chamber to occupy three distinct positions:
   a first position in which the pivoting chamber tilts upwardly above the horizontal at an angle $\alpha$ and is in alignment with said loading chute;
   a second position in which the pivoting chamber is horizontal and in alignment with said docking member; and
   a third position in which the pivoting chamber tilts downwardly below the horizontal at an angle $\beta$ and is in alignment with the unloading chute;
   said angles $\alpha$ and $\beta$ being sufficient to ensure that said part to be tested moves along said chamber solely under the effect of gravity.

2. A machine according to claim 1, wherein said docking member comprises a hollow piston connected by a flexible link to said leak detector, said piston being slidably mounted inside a fixed cylinder, said piston and cylinder co-operating with control means to enable said piston to move in either of two opposite directions relative to said cylinder, said open end of said pivoting chamber and the end of said piston furthest from its connection to said leak detector including means for sealing the join between said piston and said open end of said pivoting chamber when said piston is in its docking position against said open end.

* * * * *